United States Patent
Hemm et al.

(10) Patent No.: US 8,457,300 B2
(45) Date of Patent: Jun. 4, 2013

(54) INSTANT MESSAGE CONTACT MANAGEMENT IN A CONTACT CENTER

(75) Inventors: Thomas L. Hemm, Mukilteo, WA (US);
Joylee E. Kohler, Northglenn, CO (US);
Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 406 days.

(21) Appl. No.: 12/776,013

(22) Filed: May 7, 2010

(65) Prior Publication Data
US 2010/0296646 A1    Nov. 25, 2010

Related U.S. Application Data

(63) Continuation-in-part of application No. 10/778,960, filed on Feb. 12, 2004, now Pat. No. 7,729,490.

(51) Int. Cl.
*H04M 3/00* (2006.01)
*H04M 5/00* (2006.01)

(52) U.S. Cl.
USPC ............. 379/266.01; 379/265.1; 379/265.11; 379/265.12; 379/266.02; 379/266.03

(58) Field of Classification Search
USPC ............. 379/265.02, 265.11, 265.12, 265.09, 379/265.13, 266.06, 265.1, 266.01, 266.02, 379/266.03, 265.01; 370/230.1, 352, 229; 455/404.2
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,166,974 A | 11/1992 | Morganstein et al. | |

(Continued)

FOREIGN PATENT DOCUMENTS

| | | |
|---|---|---|
| CA | 2143198 | 1/1995 |
| CA | 2174762 | 3/1996 |

(Continued)

OTHER PUBLICATIONS

U.S. Appl. No. 09/489,722, filed Jan. 24, 2000, Thomson.

(Continued)

*Primary Examiner* — Thjuan K Addy
(74) *Attorney, Agent, or Firm* — Sheridan Ross P.C.

(57) ABSTRACT

The present invention is directed to a method for servicing a transaction in a contact center. When an instant message communication associated with a transaction is suspended prematurely, special treatment may be provided to the transaction initiator. The special treatment includes: (a) maintaining the assigned service priority for the transaction for assignment to a subsequent communication; (b) scheduling a subsequent outbound instant message to an external endpoint associated with the transaction initiator; (c) assigning to the transaction initiator a favored service priority when the subsequent inbound instant message is received by the contact center; and (d) maintaining previously selected item(s) in memory and providing the item(s) to the transaction initiator in a subsequent communication.

22 Claims, 3 Drawing Sheets

U.S. PATENT DOCUMENTS

| | | |
|---|---|---|
| 5,185,782 A | 2/1993 | Srinivasan |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,402,474 A | 3/1995 | Miller et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,559,878 A | 9/1996 | Keys et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,657,382 A | 8/1997 | Tamagawa et al. |
| 5,684,872 A | 11/1997 | Flockhart et al. |
| 5,684,874 A | 11/1997 | Flockhart et al. |
| 5,684,964 A | 11/1997 | Powers et al. |
| 5,689,698 A | 11/1997 | Jones et al. |
| 5,696,811 A | 12/1997 | Maloney et al. |
| 5,701,295 A | 12/1997 | Bales et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,668 A | 4/1998 | Pepe et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,793,861 A | 8/1998 | Haigh |
| 5,794,250 A | 8/1998 | Carino, Jr. et al. |
| 5,796,393 A | 8/1998 | MacNaughton et al. |
| 5,802,163 A | 9/1998 | Miloslavsky |
| 5,802,282 A | 9/1998 | Hales et al. |
| 5,818,907 A | 10/1998 | Maloney et al. |
| 5,825,869 A | 10/1998 | Brooks et al. |
| 5,825,870 A | 10/1998 | Miloslavsky |
| 5,828,747 A | 10/1998 | Fisher et al. |
| 5,838,968 A | 11/1998 | Culbert |
| 5,839,117 A | 11/1998 | Cameron et al. |
| 5,867,562 A | 2/1999 | Scherer |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,940,497 A | 8/1999 | Miloslavsky |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,978,465 A | 11/1999 | Corduroy et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 5,999,965 A | 12/1999 | Kelly |
| 6,000,832 A | 12/1999 | Franklin et al. |
| 6,009,157 A | 12/1999 | Bales et al. |
| 6,011,844 A | 1/2000 | Uppaluru et al. |
| 6,021,428 A | 2/2000 | Miloslavsky |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,603 A | 4/2000 | Schwartz et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,130,933 A | 10/2000 | Miloslavsky |
| 6,141,328 A | 10/2000 | Nabkel et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,223,165 B1 | 4/2001 | Lauffer |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,230,287 B1 | 5/2001 | Pinard et al. |
| 6,233,333 B1 | 5/2001 | Dezonmo |
| 6,240,471 B1 | 5/2001 | Eastwick |
| 6,259,786 B1 | 7/2001 | Gisby |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,320,956 B1 | 11/2001 | Cherry |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |

| | | | |
|---|---|---|---|
| 6,449,358 B1 | 9/2002 | Anisimov et al. | |
| 6,449,646 B1 | 9/2002 | Sikora et al. | |
| 6,453,038 B1 | 9/2002 | McFarlane et al. | |
| 6,463,148 B1 | 10/2002 | Brady | |
| 6,463,346 B1 | 10/2002 | Flockhart et al. | |
| 6,463,415 B2 | 10/2002 | St. John | |
| 6,480,826 B2 | 11/2002 | Pertrushin | |
| 6,490,350 B2 | 12/2002 | McDuff et al. | |
| 6,535,600 B1 | 3/2003 | Fisher et al. | |
| 6,535,601 B1 | 3/2003 | Flockhart et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,597,685 B2 | 7/2003 | Miloslavsky et al. | |
| 6,614,903 B1 | 9/2003 | Flockhart et al. | |
| 6,636,599 B1 | 10/2003 | Mullen | |
| 6,650,748 B1 | 11/2003 | Edwards et al. | |
| 6,697,457 B2 | 2/2004 | Petrushin | |
| 6,697,858 B1 | 2/2004 | Ezerzer et al. | |
| 6,704,409 B1 | 3/2004 | Dilip et al. | |
| 6,707,903 B2 | 3/2004 | Burok et al. | |
| 6,724,885 B1 | 4/2004 | Deutsch et al. | |
| 6,738,353 B2 | 5/2004 | Chong | |
| 6,754,333 B1 | 6/2004 | Flockhart et al. | |
| 6,766,013 B2 | 7/2004 | Flockhart et al. | |
| 6,766,014 B2 | 7/2004 | Flockhart et al. | |
| 6,947,543 B2 | 9/2005 | Alvarado et al. | |
| 6,968,571 B2 | 11/2005 | Devine et al. | |
| 7,012,888 B2 | 3/2006 | Schoeneberger et al. | |
| 7,035,927 B2 | 4/2006 | Flockhart et al. | |
| 7,124,098 B2 | 10/2006 | Hopson et al. | |
| 7,215,759 B2 | 5/2007 | Brown et al. | |
| 7,222,075 B2 | 5/2007 | Petrushin | |
| 7,236,583 B2 | 6/2007 | Beckstrom et al. | |
| 7,245,711 B2 | 7/2007 | Margolis | |
| 7,260,203 B2 | 8/2007 | Holt et al. | |
| 7,274,787 B1 | 9/2007 | Schoeneberger | |
| 7,729,490 B2 | 6/2010 | Hemm et al. | |
| 7,933,580 B2* | 4/2011 | Hasenfang et al. | 455/404.2 |
| 8,094,556 B2* | 1/2012 | Michaelis et al. | 370/230.1 |
| 2003/0174830 A1 | 9/2003 | Boyer et al. | |
| 2003/0177017 A1 | 9/2003 | Boyer et al. | |
| 2004/0039846 A1 | 2/2004 | Goss et al. | |
| 2004/0081311 A1 | 4/2004 | Thompson | |
| 2004/0161097 A1 | 8/2004 | Henry | |
| 2004/0184593 A1 | 9/2004 | Elsey et al. | |
| 2004/0193475 A1 | 9/2004 | Hemm et al. | |
| 2004/0203878 A1 | 10/2004 | Thomson | |
| 2005/0187781 A1 | 8/2005 | Christensen | |
| 2006/0177034 A1 | 8/2006 | Reding et al. | |
| 2007/0058615 A1* | 3/2007 | Hasenfang et al. | 370/352 |

FOREIGN PATENT DOCUMENTS

| | | |
|---|---|---|
| EP | 0501189 | 9/1992 |
| EP | 0701358 | 3/1996 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1081930 | 3/2001 |
| EP | 1091307 | 4/2001 |
| EP | 1120729 | 8/2001 |
| EP | 1150236 | 10/2001 |
| EP | 1564977 | 2/2006 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

U.S. Appl. No. 10/768,894, filed Jan. 29, 2004, Goringe et al.
U.S. Appl. No. 11/518,096, filed Sep. 8, 2006, Brunson.
"New Cicso ICM Integration Module for Avaya CONVERSANT" Spanlink, 2001, 2 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire (Nov. 15, 1999), 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"The GM API—About this Document" (printed Oct. 9, 2003), available at http://www.myri.com/scs/GM/doc/gm_2.html, 2 pages.
"The GM API—Copyright Notice" (printed Oct. 9, 2003), available at http://www.myri.com/scs/GM/doc/gm_1.html, 2 pages.
"The GM API—Definitions" (printed Oct. 9, 2003), available at http://www.myri.com/scs/GM/doc/gm_4.html, 2 pages.
"The GM API—Glossary" (printed Oct. 9, 2003), available at http://www.myri.com/scs/GM/doc/gm_18.html, 2 pages.
"The GM API—GM Constants and Macros" (printed Oct. 9, 2003), available at http://www.myri.com/scs/GM/doc/gm_15.html, 1 page.
"The GM API—Overview" (printed Oct. 9, 2003), available at http://www.myri.com/scs/GM/doc/gm_3.html, 2 pages.
"The GM API—Receiving Messages" (printed Oct. 9, 2003), available at http://www.myri.com/scs/GM/doc/gm_9.html, 7 pages.
"The GM API—Sending Messages" (printed Oct. 9, 2003), available at http://www.myri.com/scs/GM/doc/gm_8.html, 2 pages.
"The GM API—Table of Contents" (printed Oct. 9, 2003), available at http://www.myri.com/scs/GM/doc/gm_toc.html, 1 page.
"The GM API—Token Reference" (printed Oct. 9, 2003), available at http://www.myri.com/scs/GM/doc/gm_17.html, 2 pages.
"The GM API—Variable Index" (printed Oct. 9, 2003), available at http://www.myri.com/scs/GM/doc/gm_19.html, 2 pages.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality in IP Voice Networks," Avaya, Inc., 2002, pp. 1-17.
Dawson, "NPRI's Powerguide, Software Overview" Call Center Magazine (Jun. 1993), p. 85.

Definity Communications System Generic 3 Call Vectoring/Expert Agent Selection (EAS) Guide, AT&T publication No. 555-230-520 (Issue 4, Sep. 1995).

Doo-Hyun Kim et al. "Collaborative Multimedia Middleware Architecture and Advanced Internet Call Center," Proceedings at the International Conference on Information Networking (Jan. 31, 2001), pp. 246-50.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

Examiner's Refusal Decision dated Jul. 4, 2005 in Japanese Patent App. No. 2000-34266.

Examiner's Refusal Decision for Japanese Patent Application No. 2000-34267 dated Mar. 9, 2005 with translation, 4 pages.

Foster, Robin, et al., "Avaya Business Advocate and its Relationship to Multi-Site Load Balancing Applications," Avaya, Inc., Mar. 2002, 14 pages.

Fried, Jeff. "Skills-based routing leverages agents' strengths," Telemarketing & Call Center Solutions, Feb. 1997 [Proquest].

Geotel Communications Corporation Web site printout entitled "Intelligent CallRouter Optimizing the Interaction Between Customers and Answering Resources.", 1998, 6 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

L.F. Lamel and J.L. Gauvain, Language Identification Using Phone-Based Acoustic Likelihood, ICASSP-94, date unknown; 4 pages, submitted on Nov. 9, 2012.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

NetCall Telecom "NetCall Alert™" (printed Oct. 9, 2003) available at http://www.netcall.com/solutions/alert.asp, 2 pages.

NetCall Telecom "NetCall Directory™" (printed Oct. 9, 2003) available at http://www.netcall.com/solutions/directory.asp, 2 pages.

NetCall Telecom "NetCall FAQs" (printed Oct. 9, 2003) available at http://www.netcall.com/solutions/queuebuster_faqs.asp, 3 pages.

NetCall Telecom "NetCall HotDesk™" (printed Oct. 9, 2003) available at http://www.netcall.com/solutions/hotdesk.asp, 2 pages.

NetCall Telecom "NetCall NetCal1800™" (printed Oct. 9, 2003) available at http://www.netcall.com/solutions/netcall800.asp, 1 page.

NetCall Telecom "NetCall QueueBuster" (printed Oct. 9, 2003) available at http://www.netcall.com/solutions/queuebuster.asp, 2 pages.

NetCall USA Brochure entitled "QueueBuster™ Take Your Customers Off Hold" (undated), 6 pages, Submitted on Nov. 9, 2012.

Presentation by Victor Zue, The MIT Oxygen Project, MIT Laboratory for Computer Science (Apr. 25-26, 2000) 9 pages.

Staples et al. "CTI evolution for the 'self service' customer," Telecommunications, Dec. 1998 [Proquest].

Stevenson et al.; "Name Resolution in Network and Systems Management Environments"; http://netman.cit.buffalo.edu/Doc/DStevenson/NR-NMSE.html; printed Mar. 31, 2002; 16 pages.

Virtual Hold® Technology "Solutions—Concierge" (printed Oct. 31, 2003) available at http://www.virtualhold.com/concierge.htm, 2 pages.

Virtual Hold® Technology "Solutions—FAQ" (printed Oct. 9, 2003) available at http://www.virtualhold.com/solutionsfaq.htm, 2 pages.

Virtual Hold® Technology "Solutions—Overview" (printed Oct. 9, 2003) available at http://www.virtualhold.com/overview.htm, 2 pages.

Virtual Hold® Technology "Solutions—Rendezvous" (printed Oct. 9, 2003) available at http://www.virtualhold.com/rendezvous.htm, 2 pages.

Virtual Hold® Technology "Solutions—WebConnect" (printed Oct. 9, 2003) available at http://www.virtualhold.com/webconnect.htm, 2 pages.

Comunication dated Dec. 19, 2005 from the European Patent Office transmitting the European Search Report for counterpart Application No. 05250627.6-2414.

Official Action for U.S. Appl. No. 10/778,960, mailed Jan. 8, 2008.
Official Action for U.S. Appl. No. 10/778,960, mailed Nov. 21, 2008.
Official Action for U.S. Appl. No. 10/778,960, mailed May 19, 2009.
Official Action for U.S. Appl. No. 10/778,656, mailed Dec. 29, 2009.
Notice of Allowance for U.S. Appl. No. 10/778,960, mailed Jan. 13, 2010.

Background of the Invention for the above-captioned application (previously provided), Submitted on Nov. 9, 2012.

* cited by examiner

INSTANT MESSAGE CONTACT MANAGEMENT IN A CONTACT CENTER

CROSS REFERENCE TO RELATED APPLICATION

The present application is a continuation-in-part of U.S. patent application Ser. No. 10/778,960, filed Feb. 12, 2004, entitled "Post Termination Contact Management", which is incorporated herein by this reference.

The subject matter of the present application is related to copending U.S. application Ser. No. 09/489,722, filed Jan. 24, 2000, entitled "Automated Transaction Distribution System and Method Allowing Selection of Agents by Transaction Initiators" to Thomson et al., and U.S. application Ser. No. 10/778,656, filed Feb. 12, 2004, entitled "Transitory Contact Management" to Thomson et al., each of which is incorporated herein by this reference.

FIELD OF THE INVENTION

The invention relates generally to automated transaction distribution systems and specifically to contact centers.

BACKGROUND OF THE INVENTION

Automated transaction distribution systems use automated procedures to distribute transactions to available agents employed to handle the transactions. According to the automated procedures, an attempt is made to match a transaction to the best-qualified agent having the skills to handle the particular requirements of the transaction. In performing the match, transactions are often placed in queues, which are serviced by specific groupings of agents. Although numerous algorithms have been developed to control the wait times for enqueued transactions to receive service, it is not unusual for wait times to be on the order of 10 to 20 minutes.

The widespread use of wireless communication devices, such as cellular phones, have created a number of problems for contact centers. Users of such devices are typically charged based on air time. The longer a wireless contact remains in queue, the more air time minutes that are consumed, with a concomitant increase in the cost to the customer associated with the interaction with the contact center. These costs have led many users to abandon the contact when the wait time reaches a perceived level of unacceptability. Wireless communication device users also experience disconnects as a result of service disruptions (e.g., dead zones, cell transitions, etc.). When contacts are dropped, the contactor must call-back into the contact center and end up being re-queued. The re-queuing or "starting over" can lead to further increases in the air time minutes required to interact with the contact center. Finally, many wireless contacts encounter poor call quality while waiting in queue. When the contact is ultimately serviced, the poor call quality can detrimentally impact the ability of the contact center to provide satisfactory service.

Although some contact centers permit an enqueued contact to "opt out" under specified circumstances, the contact centers wait for the call to be delivered to the agent before calling back the caller. Such call center products are offered by Genesys and Zeacom. These products allow a caller to maintain his or her place in queue and have the system call the caller back once the call is delivered to the agent. The products virtually maintain the caller's place in queue without the caller having to be physically connected. The failure to synchronize the initiation of the call-back with the agent being ready to service the call can unnecessarily tie up contact center resources, such as the servicing agent, waiting for the customer to answer the call and lengthen the time required for the customer to receive service.

SUMMARY OF THE INVENTION

These and other needs are addressed by the various embodiments and configurations of the present invention. The present invention relates generally to a method and system for providing transaction initiators or work requestors with special treatment in the event that the contact with the transaction initiators is disconnected before the contact is serviced or during servicing of the contact by a contact center resource (or the contact is a transitory contact). As used herein, a "transitory contact" refers to a contact on any channel using any medium that is disconnected before delivery to an agent for servicing, and a "transaction" refers generally to an interaction with a contact center resource. Typically, the transaction is an item of business, such as the taking and processing of an order, providing product-related assistance, providing personal financial information, providing billing information, scheduling product service, and the like. A "transaction initiator" refers to an entity, such as a human or computational component, that initiates or causes the initiation of a transaction.

In one embodiment, the present invention is directed to a method for servicing a transaction in a contact center. When a communication associated with a transaction is disconnected prematurely, special treatment may be provided to the transaction initiator. The special treatment includes: (a) maintaining, relative to other transactions, the assigned service priority for the transaction while the communication is disconnected and assigning the assigned service priority to a subsequent inbound communication from the transaction initiator; (b) scheduling a subsequent outbound communication to an external endpoint associated with the transaction initiator; (c) assigning to the transaction initiator a favored service priority when the subsequent inbound communication is received by the contact center; and (d) when, during the first (or prior) communication, the transaction initiator selected at least one item as part of an electronic order and the first communication was disconnected before the electronic order was completed, maintaining the item(s) in memory and providing the item(s) to the transaction initiator when the transaction initiator makes a further communication with the contact center.

Rather than waiting for service while connected or the customer is online, the present invention allows the transaction initiator to wait for a service priority to be assigned and then disconnect. The transaction will not lose the assigned service priority (e.g., queue position) during or after the disconnect or state change. The transaction initiator may reconnect at a later time and check the current status of the transaction. If the transaction will be waiting longer, the transaction initiator can disconnect again and reconnect or go online at a later time. Alternatively, the transaction initiator can elect to wait for the agent after reconnection or online resumption. In either case, the contact manager maintains the transaction initiator's assigned priority so that the transaction initiator does not lose his/her "place in line." Alternatively, the transaction initiator can elect to forfeit his or her right to receive special treatment. If the transaction initiator is not connected or online at the time that the transaction is ready to be handled by the agent, the transaction initiator may be called back or the transaction set aside until the transaction initiator reconnects or goes online. After the transaction initiator reconnects or goes online, the transaction can be handled based on the agent's availability (e.g., workload criteria) and the transaction's priority relative to other transaction that have been set aside.

The work item or transaction can be a communication received on any channel and/or communication medium. The channel/communication medium used by the contact refers to a communication technique, pathway, or method as defined, governed, or enabled by one or more selected protocols (e.g., a packet-based protocol such as TCP/IP, RTP, and RTCP, an asynchronous transfer mode protocol, and a frame relay protocol or a circuit-switched protocol), algorithms (e.g., software applications, such as E-mail, Web browsers, instant messaging, text chat, Integrated Services Digital Network or ISDN, QSIG, DPNSS, SIP, H.323, VDP, and SGCP, etc.) switches or routers, and/or communication medium (e.g., twisted wire, coaxial cable, fiber optic cable, wireless, cellular, and PCS™ of U.S. Sprint). For example, voice-only wired telephone communications over the PSTN represent one channel, voice-over-IP telephony yet another channel, voice-only wireless telephone communications a further channel, non-voice IP telephony (e.g., a text web chat) a further channel, multi-media telephony (e.g., a video call) over the PSTN a further channel, instant messaging over the data network a further channel, a Web conference over the Internet a further channel, etc.

The transaction initiator may be a customer or some other type of nonsubscriber. As discussed in the parent application, the contact center can, in one embodiment, be configured to permit a transaction initiator to select an agent to service their respective transaction based on agent information, which may include agent attributes (e.g., an agent identifier, a listing of agent skills, a listing of agent skill proficiency levels, a listing of agent personal background/characteristics, a listing of agents who backup an agent, and an agent/transaction initiator transaction history, etc.), agent availability (e.g., a listing of transactions currently queued to an agent, time until agent availability, etc.), and other criteria. The agents may be human agents or automated agents.

The assigned service priority can be one or more of a queue position or slot, an arrival or receipt time of the communication, a current or estimated wait time, a target service time, predicted business value based on discernable transaction properties, and the like.

The termination of the communication may be initiated by the transaction initiator or contact center. It may be voluntary or involuntary. For example, the termination may be the result of an excessive or unacceptable wait time, a loss of or dropped connection, poor quality of contact, low QoS, or endpoint or intermediate node or link malfunctions, a decision that servicing is not required at the present time or ever, contact center workflow levels, agent availability, conservation of limited communication resources, and the like.

The decision whether or not to grant special treatment may be made universally or on a work item-by-work item basis. In the latter case, the decision is typically based on a weighting of a number of criteria, including contactor or transaction initiator information, contact center destination of the communication, the channel used for the communication, the communication medium used for the communication, an information identifier digit (e.g., identifying a cell phone, pay phone, etc.) received during set up of the communication, a contact Quality of Service metric for the communication and contact center state (e.g., workflow level, agent availability level, current or expected wait times, etc.). For example, when a high valued customer has a transitory contact a call-back may be scheduled regardless of the channel, called destination, II digits, or QoS. When a transitory contact channel such as a wireless cellular phone or instant messaging session has one or more QoS characteristics outside of selected quality (acceptable) thresholds, special treatment may be provided to the contactor regardless of the customer information or called destination, based on the assumption that the termination was involuntary or voluntary due to the poor quality of the connection. As will be appreciated, the reasons for disconnection by the contactor include, without limitation, excessive wait time, loss of connection, poor quality of contact, decision that servicing is not required at the present time or ever, cost of call, remaining (low) battery life of cellular phone, and the like.

Embodiments of the present invention can have numerous advantages over the prior art. For example, users of wireless devices can have the freedom to abandon voluntarily expensive contacts or contacts of poor quality without sacrificing their previously assigned servicing priorities. Through maintenance of assigned priorities, users of wireless devices are also not penalized for an involuntary loss of connection, such as commonly occurs when the cellular network drops a connection or a network bandwidth shortage interferes with an instant messaging session. Embodiments of the present invention can schedule call-backs before the agent is available for servicing of the outbound contact, thereby avoiding unnecessary tie ups of contact center resources, such as the servicing agent, while waiting for the customer to answer the call or respond to an instant message and shortening the time required for the customer to receive service. This is made possible by providing the contact center with sufficient intelligence to estimate when an agent will be available to handle the contact and to contact the customer again when the agent is expected to be available within a short (or predetermined) period of time or when the virtual queue position assigned to the first communication reaches a selected queue position. Embodiments of the present invention can avoid the placement by customers of multiple contacts over VoIP, cellular phone, and other communication channels, leading to customer frustration. When multiple unsuccessful and low QoS contacts are made by a customer on the same or different communication channels within a defined period of time, the service priority of the transaction common to the various contact attempts can be elevated to a level higher than that of other, less frequent low QoS contacts by other customers.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "contact" refers to any voice, text, and/or video electronic communication, such as a voice call, E-mail, instant message, text chat, and VoIP call.

The term "customer" denotes a party external to the contact center irrespective of whether or not that party is a "customer" in the sense of having a commercial relationship with the contact center or with a business represented by the contact center. "Customer" is thus a shorthand, as used in contact center terminology, for the other party to a contact or a communications session.

The terms "determine", "calculate" and "compute," and variations thereof, as used herein, are used interchangeably and include any type of methodology, process, mathematical operation or technique.

The terms "instant message" and "instant messaging" refer to a form of real-time text communication between two or more people, typically based on typed text. The instant message is conveyed by an instant messaging program offered by a service, such as AOL™, MSN Messenger™, Yahoo! Messenger™, Live Messenger™, and Apple's iChat™. Generally included in the instant messaging software is the ability to see the presence of another party; that is, the ability to see whether a chosen friend, co-worker or other selected person (known as a "buddy") is online and connected through the selected service. Instant messaging differs from ordinary e-mail in the immediacy of the message exchange and also makes a continued exchange simpler than sending e-mail back and forth. Instant messaging, unlike e-mail, is also generally stateless. Most exchanges are text-only, though some services now allow voice messaging, file sharing and even video chat (when both users have cameras). For instant messaging to work, both users must be online at the same time and the intended recipient must be willing to accept instant messages. An attempt to send an instant message to someone who is not online (or is offline), or who is not willing to accept instant messages, will result in a notification that the transmission cannot be completed. If the online software is set to accept instant messages, it alerts the recipient with a distinctive sound and provides a window that collectively indicates that an instant message has arrived. The window allows the recipient to accept or reject the incoming instant message. An instant message session is deemed to disconnect, or be disconnected, when the user goes offline, refuses to accept an instant message, or is suspended by the user failing to respond to an instant message after a predetermined period of time after an instant message is sent and/or received. An instant message session is deemed to be reconnected (or a call-back deemed to occur) when the user resumes the instant messaging session, such as by responding to an outstanding instant message.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The term "VoIP" refers to a family of transmission technologies for delivering packetized voice communications over IP networks such as the Internet or other packet-switched networks, rather than the public switched telephone network (PSTN). Other terms frequently encountered and synonymous with VoIP are IP telephony, Internet telephony, voice over broadband (VoBB), broadband telephony, and broadband phone. Common protocols for VoIP include H.323 and the Session Initiation Protocol.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing. By way of example, the invention can be used with an instant-messaging capable contact center to inform the contact center of a probability that an instant messaging session has been interrupted by link, network, endpoint, or Quality of Service (QoS) problems.

Figure 1:
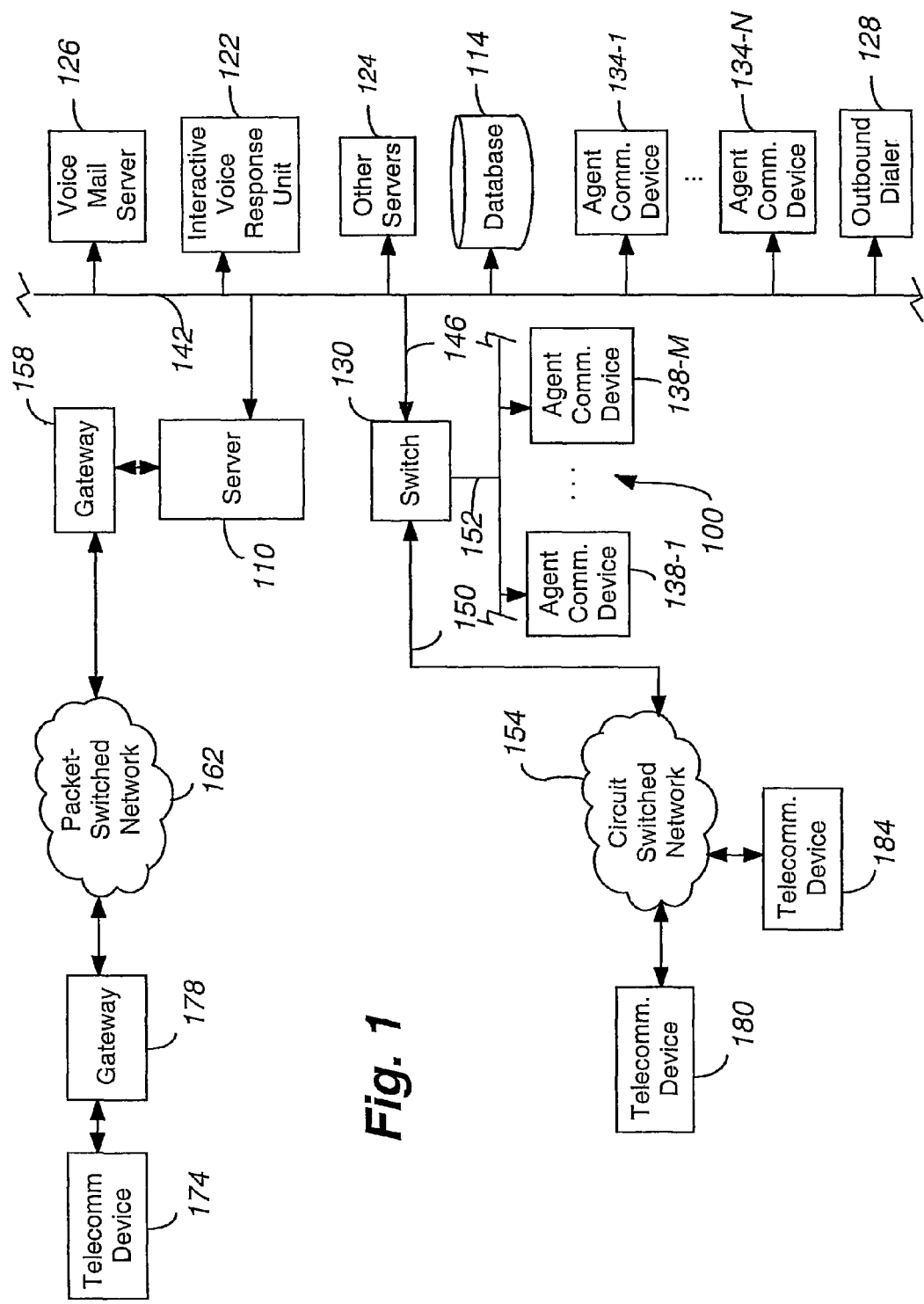
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 126, an Interactive Voice Response unit or IVR 122, and other servers 124, an outbound dialer 128, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

Figure 2:
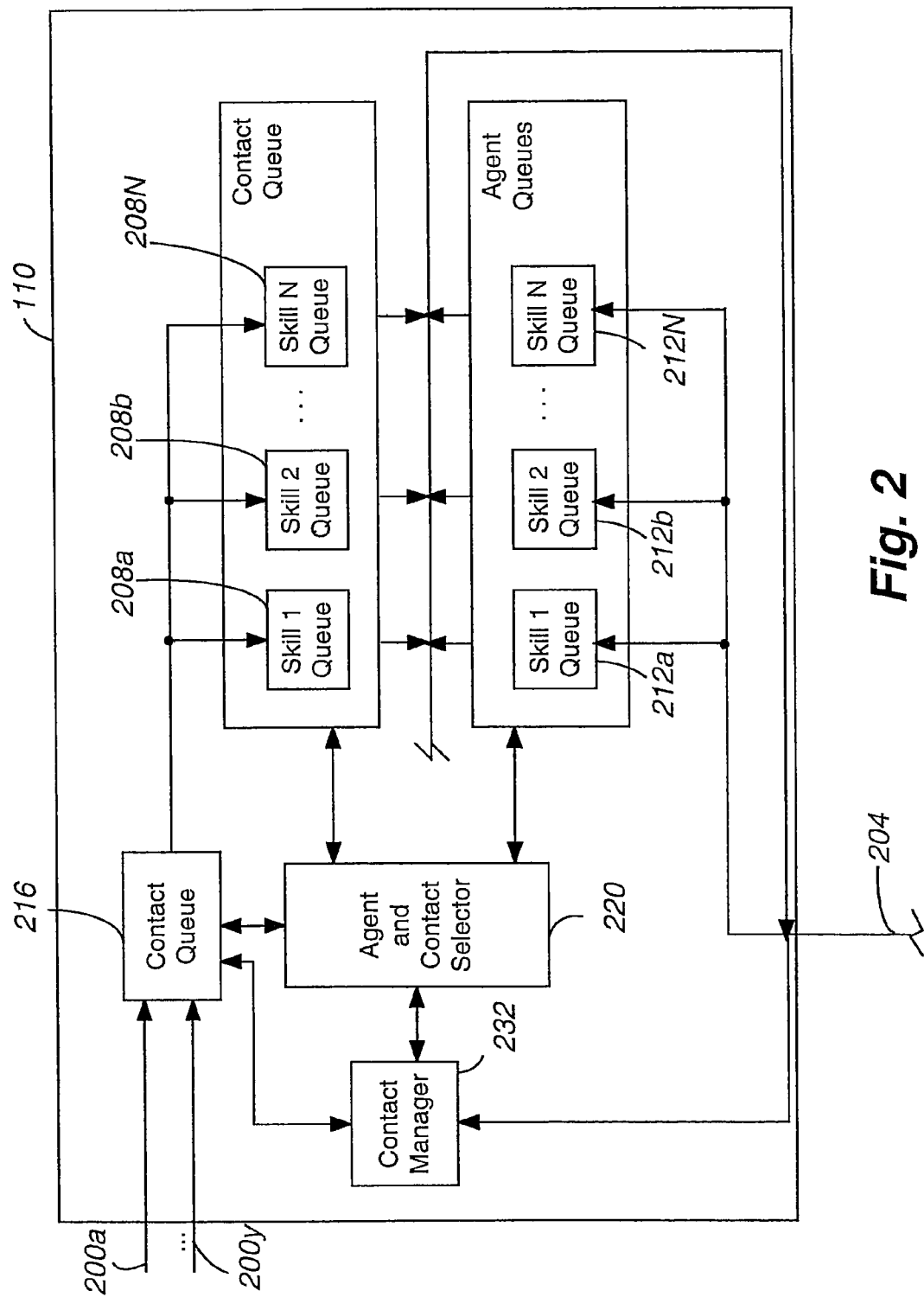
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Basic Call Management System or BCMS (not shown) and a Call Management System or CMS (not shown) that gathers call records and contact-center statistics for use in generating contact-center reports.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, Business Advocate™, Call Center™, Contact Center Express™, Interaction Center™, and/or S8300™, S8400™, S8500™, and S8700™ servers; or Nortel's Business Communications Manager Intelligent Contact Center™, Contact Center-Express™, Contact Center Manager Server™, Contact Center Portfolio™, and Messaging 100/150 Basic Contact Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their respective orders of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be Avaya Inc.'s, G250™, G350™, G430™, G450™, G650™, G700™, and IG550™ Media Gateways and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 1600™, 4600™, and 5600™ Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner. The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, the instant messaging server, and/or first or second telecommunication device 134, 138 associated with a selected agent. The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

The contact center, in one configuration, includes an automated instant messaging server as another server 124. When a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., telephone number) of the customer's communication device with an electronic address (e.g., telephone number) of the agent's communication device in a manner similar to that used for a voice call. The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, then the server 110 instructs the instant messaging server to redirect the instant messaging conversation to that available agent's communication device 134-1 ... N. The server 110 routes, substantially in real-time, subsequent instant messages from the agent's communication device to the customer's communication device and from the customer's communication device to the agent's communication device. Additional details on instant message capable contact centers are discussed in copending U.S. application Ser. No. 10/787,922, filed Feb. 25, 2004, entitled "Using Business Rules for Determining Presence", which is incorporated herein by this reference. According to the invention, included among the programs executing on the server 110 are an agent and contact selector 220 and contact manager 232. The selector 220 and manager 232 are stored either in the main memory or in a peripheral memory (e.g., disk, CD ROM, etc.) or some other computer-readable medium of the center 100. The selector and manager collectively effect an assignment between available contacts in a queue and available agents serving the queue in a way that tends to maximize contact center efficiency. The selector 220 uses predefined criteria in selecting an appropriate agent to service the contact. The manager 232 assigns services priorities to contacts and, as part of this function, identifies contacts as disconnected or transitory contacts and determines whether such contacts merit special treatment. The manager 232 provides instructions to the selector 220 to effect the special treatment.

Identifying a contact, as a transitory contact, is normally self-evident. An abandon, or pre- or mid-service, disconnection of a voice call, before service is completed, is an obvious transitory contact. Suspension of an instant message session may or may not qualify as a transitory contact. If a customer is still shown to the servicing agent as being online or "present" but is not responding, it is not clear whether the customer has decided to suspend the contact indefinitely or is responding to other instant message threads or is otherwise occupied or unable to respond. Determining the Quality of Service ("QoS") of the instant messaging channel(s) can provide an indication of the contact state, or intention of the customer.

The contact manager 232, based on one or more selected criteria, determines whether a transitory contact is entitled to special treatment by the contact center. Special treatment includes holding the transitory contact's position in queue, scheduling a call-back on the same channel before the position is eligible for delivery to an agent for servicing, providing the transitory contactor with a favored position in queue if the contactor calls back within a selected period of time, providing a transitory contactor with a wait time allowance if the contactor calls back within a certain period of time, retaining data received from the contactor during the transitory contact in memory for a specified period of time in the event of a recontact, and contacting the transitory contactor on another channel.

Holding the transitory contact's position in queue effectively provides the transitory contactor with a virtual queue position. After termination of the transitory contact, the contactor can recontact or reconnect to the contact center and obtain his or her queue position reflecting advancements during the termination of the contact and the recontact. For example, if the contactor was fifteen positions from the head of the queue when the transitory contact terminated and ten enqueued contacts were serviced from the queue during the time between the termination and recontact by the transitory contactor, the recontact would be placed in a queue position that was five positions from the head of the queue. Assuming that the contactor does receive the virtual queue position, he or she could have other types of special treatment applied upon the maturity of the virtual queue position to a specified queue position such as the "next call for deliver" or ncfd queue position. For instance, further advancement in the queue could be retarded for an administrable time to afford the contactor more time to reclaim the position which would subsequently commence normal advancement upon recontact. Alternately, upon maturation to a specified queue position, such as the ncfd+1 queue position, the virtual queue position could also be moved backwards in the queue or transferred to another queue established for the purpose of queuing mature transactions pending recontact.

Scheduling a call-back before the transitory contact's queue position is eligible for delivery to an agent for servicing provides the transitory contactor with immediate service when the contact-center initiated contact is answered by the transitory contactor. Instead of waiting for the queue position to be ready for delivery to an agent, the contact center predicts, based typically on the virtual queue position and the servicing environment, when an agent will be available to service the contact center initiated (re)contact, or "call-back", and initiates the call-back an optimized time before delivering the contact to the agent, before or when the virtual queue position reaches a selected position relative to the head of the queue, within a selected period of time of the virtual queue position being at the head of the queue, or when the estimated wait time reaches a predetermined value. As will be appreciated, the trigger for initiating a call-back to the contactor depends on the rate at which the work items or transactions enqueued between the work item and the head of the queue are serviced. To avoid contact center resources waiting for the outbound contact to be answered, the time at which the outbound contact is initiated is synchronized with the projected rate of servicing of each work item and the number of intervening work items. This provides the advantage of delivering only answered or active contacts to the agent, or not delivering contacts that are unanswered by the person requesting the call-back (e.g., the person left the premises prior to the call-back). In the latter situation, the contact center would need to set up an IVR (or some form of automated system or interactive response unit) to interact with the called back party. The IVR, when the call-back is answered, could inform the contactee of the fact that the virtual queue position is now ready for servicing and to hold while the contact is connected or directed to an agent. It may also include an estimate of the wait time until the contact is serviced by an agent and/or verify that the contactee is the same as the person requesting the call-back.

Providing the transitory contactor with a favored position in queue if the contactor calls back within a selected period of time permits the transitory contactor to voluntarily or involuntarily terminate the contact and, within the selected period of time, call-back and obtain a better queue position than if he had contacted the contact center for the first time after the selected period of time. The queue position may be the same as the virtual queue position. It may also be at a lower or higher queue position.

Providing a transitory contactor with a wait time allowance if the contactor calls back within a certain period of time is another way to provide a favored queue position to the contactor. However, the amount of the wait time allowance could be related directly or inversely to the amount of time between the contact termination and call-back. For example, if the amount of time is less than a first threshold the contactor would receive allowance for a first wait time, and, if the amount of time is less than a second threshold but more than the first threshold, the contactor would receive allowance for a second wait time. The second wait time may be more or less than the first wait time.

Retaining data received from the contactor during the transitory contact in memory for a specified period of time in the event of a recontact is particularly useful in a Web setting. For example, if a contactor has a shopping cart or basket containing various items and the contact is terminated before the electronic order can be processed the contents of the shopping cart or basket can be maintained in memory. In this way, if the contactor recontacts the Web site within a selected period of time after the termination, he or she could be provided with a display requesting whether or not the contactor wishes to proceed with the processing of further revisions (additions, deletions, or changes) to the order. Alternatively, a message, such as a Web page, email, instant message, and the like could be forwarded to the customer indicating that the order is ready for processing if the customer reconnects to the Web site. The shopping cart can also be available to an agent if the customer reconnects via a different media, such as voice. The scenario may be a bad connection (e.g., slow) and the person wants to switch to voice. Rather than having to specify the order that was partially completed on line, the agent would have the ability to use the order information, previously provided by the customer, to complete the order. Many orders are never processed on the Web due to involuntary (or voluntary) terminations and an unwillingness by the user to spend the time to re-input the electronic order.

Contacting the transitory contactor on another channel can range from calling a cellular phone contactor back on a wired phone, calling a contactor using a packet-switched connection back on a circuit-switched connection, and sending the contactor an email, instant message, page, and the like indicating that the system noticed an abandon and inquiring if the contactor is still in need of assistance. If the contactor is in need of assistance, various further contact options can be provided to the contactor, which can include special treatment offers.

The selected criteria used to determine whether a contact is a transitory contact and/or whether to afford a contactor special treatment and/or the type of special treatment are typically based on one or more of (a) contactor information, (b) the destination of the contact, (c) the channel/communication medium used by the contact, (d) information identifier or II digits, (e) Quality of Service or QoS metrics for the transitory contact, and (f) the contact center state (e.g., workload/agent availability).

The contactor information refers to information relating to the contactor, including without limitation the customer identity, the assigned customer class (gold, silver, bronze, etc.) or value, the sales history of the customer, the potential revenue realizable from completion of the transitory contact, the interaction history with the customer, the purpose of the customer's contact, the degree of completion of the contact when terminated, the state of the transitory contact, and the like.

The destination of the contact refers to the contact center address to which the transitory contact is directed. By way of example, if the contact is directed to sales as opposed to service personnel special treatment may be appropriate.

One channel/communication medium, such as wireless channels/communication media, may receive special treatment or different types of special treatment over other different channels/communication media, such as wired channels/communication media. Information Identifier digits identify the type of calling party (e.g., cell phone user, pay phone user, jail phone user, etc.).

The Information Identifier or II digits are normally received during call setup.

The Quality of Service refers to the transmission characteristics end-to-end for the transitory contact, such as available bandwidth, maximum end-to-end delay (packet latency), maximum end-to-end delay variation (jitter), and packet/cell loss. QoS metrics can be obtained by techniques known to those of ordinary skill in the art. They can, for example, be obtained, by measurement techniques, by the server 110 or an intermediate node, from session signaling (such as Real-Time Transport Protocol), and from monitoring local de jitter or playout buffers. When QoS metrics indicate a poor QoS, suspended instant messaging sessions, for example, can be assumed to be involuntary and unintentional. In response, an instant message could be sent providing the customer with instructions to obtain special treatment.

Finally, contact center state can be an important factor in determining whether to provide a transitory contact or special treatment. During periods of heavy contact center workload and/or low agent or resource availability, special treatment offerings and/or options may be more limited (or even eliminated) than during periods of light workload and/or high agent or resource availability.

The decision to grant special treatment is typically based on a weighting of these criteria. For example, when a high valued customer has a transitory contact a call-back may be scheduled regardless of the channel, called destination, II digits, QoS or contact center state. When a transitory contact channel is via a wireless cellular phone or has one or more QoS characteristics outside of selected quality (acceptable) thresholds, special treatment may be provided to the contactor regardless of the customer information, called destination or contact center state, based on the assumption that the termination was involuntary or voluntary due to the poor quality of the connection or high airtime costs from waiting for servicing. Regarding airtime costs for example, a long distance call by a cell phone user, if abandoned, is indicative of a transitory contact abandoned due to high airtime costs. Caller identification information can be captured by the server to identify long distance calls. Such information would include international dialing digit (e.g., international access code), country code, and area code. Special treatment might, for example, be given to transitory contacts or contacts generally from long distance cell phone users (international and/or national long distance) but not from local (non-long distance) cell phone users. In one configuration, special treatment, for transaction initiators within a common class or type of customers (e.g., gold, silver or bronze customers) is provided to long distance cellular calls (based on one or more of international access code, country code, and area code) when compared to less expensive (e.g., local) cellular calls; that is, when a first cellular call is long distance and a second cellular call is not and the calls are received at substantially the same time, the first cellular call is provided with special treatment simply because it is long distance and not due to other factors, such as customer identity. In another example, special treatment is accorded international long distance cellular calls but not national long distance or local (non-long distance) cellular calls. In other applications, special treatment is provided only when two or more criteria noted above are applicable.

In another configuration, the contact manager encourages transitory contacts at the request of the customer by notifying the customer of special treatment in the event of early termination. If a contact is enqueued, the contactor can hit a digit, icon, or other indicator to notify the contact center of a need for assistance. Upon receipt of the message, the contact center would prompt the contactor as to what action is being requested, e.g., a call-back, a change in priority/urgency, etc. If the contactor elects a call-back, a special access code or key could be provided to the contactor with an associated expiration time. The contactor can then call-back at a more convenient time and obtain special treatment by inputting the access code correctly. This is a proactive method of monitoring the needs of the contactor rather than waiting for a period of time before querying the contactor for a change in action (e.g., every three minutes asking the contactor if they want to leave a message, request a call-back, wait in queue, or hang up and call-back in at a later time).

Figure 3:
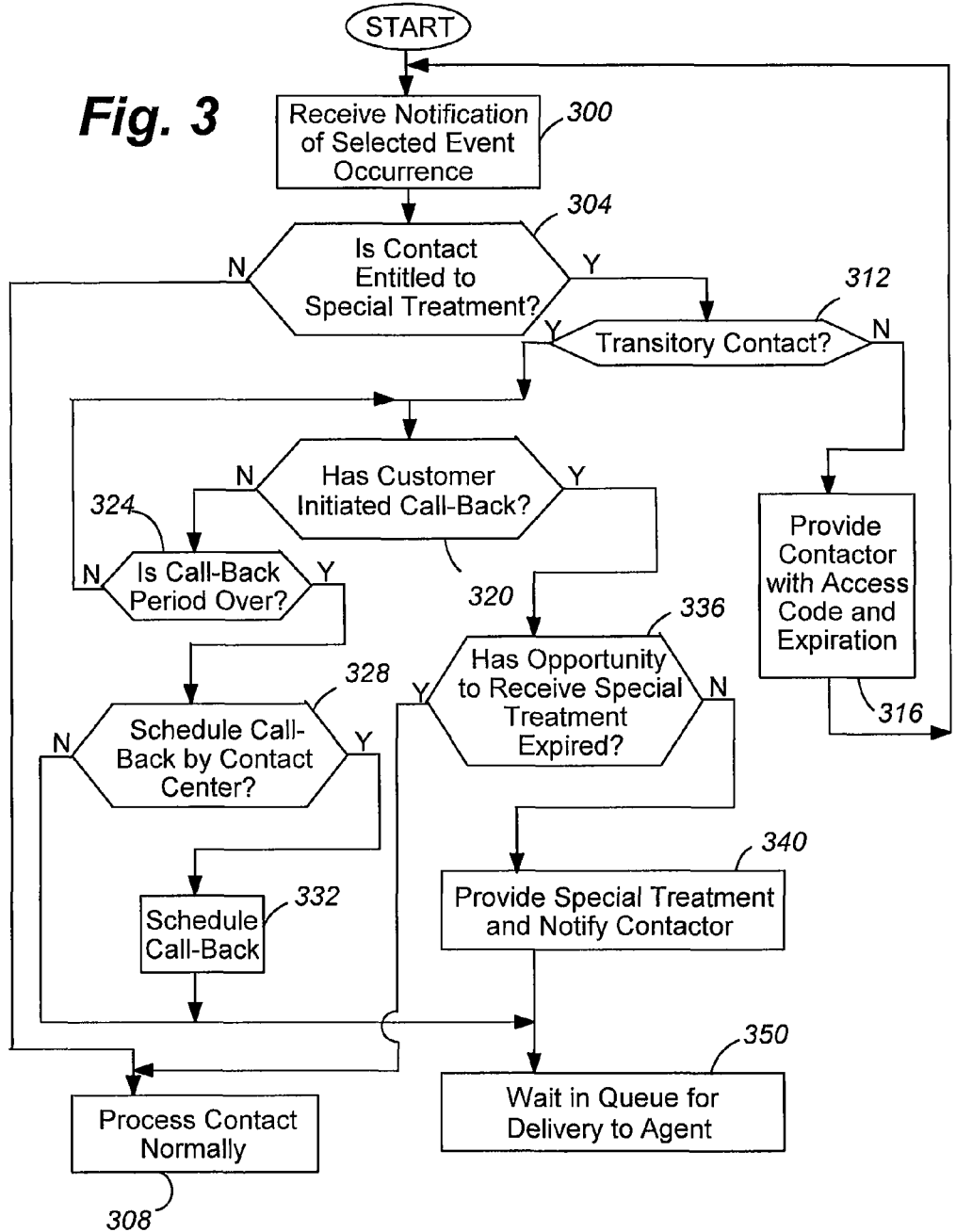
FIG. 3 is a flow chart depicting an operational embodiment of the contact manager.

The operation of the contact manager 232 is provided in FIG. 3.

In step 300, the manager 232 receives notification of the occurrence of a selected event. The event can be the occurrence of a transitory contact that was not authorized previously by the contact center in response to a request from the contactor or the receipt of a request, such as a touchtone or DTMF digit, from an enqueued contactor to receive special treatment, or the early disconnection of an enqueued contact without loss of assigned service priority.

In decision diamond 304, the manager 232 determines whether the contactor is entitled to receive special treatment. As noted above, this determination is made using one or more of (a) contactor information, (b) the destination of the contact, (c) the channel/communication medium used by the contact, (d) II digits, (e) QoS metrics for the transitory contact, and (d) contact center state.

When the contactor is not entitled to receive special treatment, the contact is processed normally in step 308. For a transitory contact, normal processing means to do nothing further respecting the transitory contactor/contact. For a contactor requesting special treatment, the contact center may not offer the contactor special treatment at all or only specific types of special treatment, such as a contact center initiated call-back or a virtual queue position.

When the contactor is entitled to receive special treatment, the manager, in decision diamond 312, determines whether the selected contact is a transitory contact or an enqueued contactor's request for special treatment. In other words, the manager determines whether the triggering event in step 300 is the prior unauthorized disconnection of an enqueued contact or the receipt of a signal from a currently enqueued contactor requesting special treatment. In the latter case, the manager 232 proceeds to step 316 and provides the contactor with an access code and access code expiration time. As noted above, the access code provides the contactor with the opportunity to disconnect the contact and receive special treatment when a later contact is initiated with the contact center before expiration of the code. In the former case, the manager proceeds to decision diamond 320.

In decision diamond 320, the manager 232 determines whether the contactor (responsible for the transitory contact) has initiated a call-back (or a second contact by the same or different channel) to the contact center. The contactor information in the database 114 or a presence server or service can include a listing, for the contactor, of the electronic address of each associated endpoint or communication device associated with the contactor. If the contactor (responsible for the transitory contact) has not called back, the manager, in decision diamond 324, determines whether the predetermined period for the contactor to use the call-back option is over. This period is typically measured from the time of the termination for a transitory contact but may be the point in time at which the virtual queue position associated with the transitory contactor reaches a selected queue position or a selected time of day. As will be appreciated, the contact center will track the number of permitted call-backs that are expected to be received within a selected period of time and attempt to attribute the call-backs by assigning different durations or expiration times. The time period may end before or after the queue position of the transitory contact reaches the head of the queue. In any event if the period has not yet expired, the manager returns to and repeats decision diamond 320 after a suitable time out period.

If the call-back period has expired, the manager 232, in decision diamond 328, determines whether a call-back, on the same or a different channel, is to be scheduled by the contact center. If it is not to be schedule, the manager 232 proceeds to step 300 to await the occurrence of the next selected event. In other words, the transitory contactor has abandoned his or her right to receive special treatment. If the contactor calls back, the contact will appear as a new contact. If the call-back is to be scheduled, the manager 232 in step 332 schedules the call-back for the outbound dialer 128 and proceeds to step 300.

Returning again to decision diamond 320, when the customer has called back the manager 232 proceeds to decision diamond 336, where the manager 232 determines if the contactor's time to receive special treatment has expired. If the time has expired, the manager 232 proceeds to step 308. In step 308, the manager 232 instructs the selector 220 to process the contact normally (or the same as other incoming contacts, which servicing can include waiting in queue at the queue tail). If the time has not expired, the manager proceeds to steps 340 and 350 and provides special treatment to the second contact initiated by the transitory contactor. The contactor is notified of the special treatment. For example, upon reconnecting or resuming the contact, the contactor is provided with an announcement, such as a voice announcement, or an instant message, welcoming him or her back, providing the estimated wait time to servicing, and/or prompting the contactor for the next desired action (e.g., leave a message in voice mail, wait in queue, set up a further call-back by the contactor, schedule a call-back by the contact center, etc.).

A number of variations and modifications of the invention can be used. It would be possible to provide for some features of the invention without providing others.

For example, the contactor can be notified of his or her right to receive special treatment when the initial contact is received and before termination. The notification can be a message such as "We have identified you as calling from a cell phone. In case of a drop, feel free to call-back within 3 minutes to maintain your position in queue. You may also choose at this time to be called back shortly before an agent is available to assist you."

There could be multiple recontact periods or thresholds with various assigned privileges and benefits. By way of illustration, upon or after the expiration of a first threshold (without a further contact by the customer who terminated the initial contact prematurely) an alternate channel/media, such as email, or instant messaging may be used to provide the user with a custom destination (i.e., Universal Resource Locator or URL, phone number, IP address, etc.) for the caller to go to and reclaim the expired privileges based on providing certain information, possibly a key, access code, or some identification (such as phone number or some combination thereof) known to or previously to the customer by the contact center. Correct entry of the information could result in reinstatement of expired privileges, for instance, associated with a new (administrable) queue position established on their behalf. The new queue position may be the same as or different from a virtual queue position originally assigned to the initial customer contact. Alternatively, the permission could be granted before a contact has been made by the customer. For example, a mass emailing to selected customers or sets of customers could provide the privilege of a queue position under administrable circumstances, such as in the event of premature termination of a contact, based on the simple acceptance of the offer. This variation allows a non-realtime communication modality, such as email, to reserve the special privilege on a different real-time media, such as a live voice communication or instant message. The privilege could also be scheduled or "reserved" using this same mechanism.

The server may use a work assignment algorithm that does not use a queue. In that event, the contact would have associated contact information, such as how long the contact has been waiting, the contact's priority, the contact's media channel, and the contact's business value. The contact is handled based on the known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The present invention may be implemented as software, hardware (such as a logic circuit), or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving, by a gateway, a first transaction for servicing by a contact center resource, the first transaction corresponding to a first communication with a first external endpoint associated with a transaction initiator, the first communication being packet-switched;
   (b) assigning, by a processor executable contact manager, a service priority to the first transaction, wherein the first communication is disconnected after the service priority is assigned to the first transaction and before servicing of the first communication is completed;
   (c) determining, by the processor executable contact manager, a Quality of Service (QoS) metric connected directly or indirectly with the first communication;
   (d) determining, by the processor executable contact manager and based on the QoS metric, whether to provide special treatment to the transaction initiator, wherein special treatment includes at least one of:
      (i) maintaining, relative to other later transactions, the assigned service priority for the first transaction while the first communication is disconnected and assigning the assigned service priority to a second inbound communication from the transaction initiator;
      (ii) scheduling a second outbound communication to at least one external endpoint associated with the transaction initiator, wherein the second outbound communication is to be initiated before the assigned service priority is eligible for delivery to an agent;
      (iii) assigning to the transaction initiator a favored service priority when the second inbound communication is received by the contact center, wherein the favored service priority is entitled to receive service in less time than a default service priority that would have been provided to the second inbound communication in the absence of special treatment being provided to the transaction initiator; and
      (iv) when, during the first communication, the transaction initiator selected at least one item as part of an electronic order and the first communication was terminated before the electronic order was completed, maintaining the at least one item in memory and providing the at least one item to the transaction initiator when the transaction initiator makes a further communication with the contact center.

2. The method of claim 1, wherein the first communication is an instant messaging session and wherein the disconnection is identified by at least one of the transaction initiator going offline during the instant messaging session, the transaction initiator refusing, during the instant messaging session, to accept an incoming instant message from the contact center, and the contact center, during the instant messaging session, failing to receive, within a predetermined time, a response to a sent instant message.

3. The method of claim 1, wherein the first communication is a voice-over-Internet Protocol call.

4. The method of claim 1, wherein the special treatment is item (i) and wherein the special treatment is provided to the transaction initiator.

5. The method of claim 4, wherein the assigned service priority corresponds to a queue position and wherein, in the maintaining step (i), the assigned queue position is advanced towards the head of the queue after the disconnection of the first communication and before receipt of the second inbound communication.

6. The method of claim 4, wherein the assigned service priority is at least one of an expected and predicted wait time for servicing and wherein the at least one of the expected and predicted wait time is decreased after the disconnection of the first communication and before receipt of the second inbound communication.

7. The method of claim 4, wherein the assigned service priority is an actual wait time, wherein a second wait time is assigned to the second inbound communication upon receipt of the second inbound communication, and wherein the actual wait time of the first communication is no more than the second wait time.

8. The method of claim 4, wherein the assigned service priority is a time associated with the first communication and wherein the second inbound communication is on a channel different from the channel of the first communication and further comprising:
   when an assigned queue position reaches the head of a queue, holding the first transaction ready for immediate delivery to the agent for a selected period of time.

9. The method of claim 1, wherein the special treatment is item (ii) and wherein the special treatment is provided to the transaction initiator.

10. The method of claim 1, wherein the special treatment is item (iii) and wherein the special treatment is provided to the transaction initiator.

11. The method of claim 10, wherein the favored service priority is a first queue position, wherein the default service priority is a second queue position, and wherein the second queue position is farther from the head of the queue than the first queue position.

12. The method of claim 10, wherein the favored service priority is a first expected wait time, wherein the default service priority is a second expected wait time, and wherein the first expected wait time is less than the second expected wait time.

13. The method of claim 10, wherein the favored service priority is a first actual wait time, wherein a second actual wait time is assigned to the second inbound communication upon receipt of the second inbound communication, and wherein the first actual wait time is no more than the second actual wait time.

14. The method of claim 13, wherein the favored service priority is different from the assigned service priority adjusted for the time between the time of termination of the first communication and receipt of the second inbound communication.

15. The method of claim 1, wherein the special treatment is item (iv) and wherein the special treatment is provided to the transaction initiator, wherein the electronic order is a shopping cart on a Web site, and further comprising:
   sending the transaction initiator a message requesting the transaction initiator to completing of the electronic order.

16. A non-transient computer readable medium comprising processor executable instructions, that, when executed, perform the steps of claim 1.

17. A method, comprising:
   (a) receiving, by a gateway, a real-time packet switched communication from a first transaction initiator;
   (b) determining, by a processor executable contact manager, that the real-time packet switched communication has disconnected prematurely;

(c) determining, by the contact manager, at least one Quality of Service ("QoS") metric indicative of a QoS of the real-time packet switched communication; and
(d) determining, by the contact manager and based on the QoS metric, a probable reason for the premature disconnection.

18. The method of claim 17, wherein the first and subsequent communications are part of a common first transaction and further comprising:
(e) based on the QoS metric, determining, by the contact manager, that the premature disconnection was involuntary and that a subsequent communication by the first transaction initiator is entitled to special treatment and wherein the special treatment is at least one of the following:
(E1) providing, by the contact manager, the subsequent communication by the first transaction initiator with a higher service priority for the subsequent communication than the subsequent communication would otherwise be entitled to at the time of receiving the subsequent communication in the absence of special treatment;
(E2) providing, by the contact manager, the first transaction initiator, upon receipt of the subsequent communication, with a wait time allowance; and
(E3) scheduling, by the contact manager, an outbound communication to the first transaction initiator to service the first transaction.

19. The method of claim 17, wherein the special treatment is (E1).

20. The method of claim 17, wherein the special treatment is (E2).

21. The method of claim 17, wherein the special treatment is (E3).

22. A non-transient computer readable medium comprising processor executable instructions, that, when executed, perform the steps of claim 17.

* * * * *